United States Patent [19]
Koved

[11] Patent Number: 5,915,085
[45] Date of Patent: Jun. 22, 1999

[54] MULTIPLE RESOURCE OR SECURITY CONTEXTS IN A MULTITHREADED APPLICATION

[75] Inventor: Lawrence Koved, Pleasantville, N.Y.

[73] Assignee: International Business Machines Corporation, Armonk, N.Y.

[21] Appl. No.: 08/810,174

[22] Filed: Feb. 28, 1997

[51] Int. Cl.$^6$ .................................................. H04L 9/00
[52] U.S. Cl. ........................................................ 395/186
[58] Field of Search ...................... 380/4, 25; 395/186, 395/187.01, 188.01

[56] References Cited

U.S. PATENT DOCUMENTS

| | | | |
|---|---|---|---|
| 4,919,545 | 4/1990 | Yu ....................................... | 395/187.01 |
| 5,265,206 | 11/1993 | Shackelford et al. .................. | 395/186 |
| 5,412,717 | 5/1995 | Fischer ................................. | 380/4 |
| 5,692,047 | 11/1997 | McManis ............................... | 380/4 |
| 5,740,248 | 4/1998 | Fieres et al. ........................... | 380/25 |
| 5,754,763 | 5/1998 | Bereiter ................................. | 395/187.01 |
| 5,802,276 | 9/1998 | Benantar et al. ....................... | 395/186 |

OTHER PUBLICATIONS

Codella et al., "A Toolkit for Developing Multi–user, Distributed Virtual Environments," IEEE, pp. 401–407, Sep. 18–22, 1993.

Dean et al., "Java Security, from Hot Java to Netscape and Beyond," IEEE, pp. 190–200, May 6–8, 1996.

*Primary Examiner*—William M. Treat
*Attorney, Agent, or Firm*—Kevin M. Jordan

[57] ABSTRACT

A method and system for creating flexible security control mechanisms and virtualization of nominally shared system resources. The goal is to minimize the potential for interference between concurrently executing applications in a multithreaded environment. Executable content is associated with security policies appropriate to the content, and policies are associated with the content loader; security policies are dynamically computed so that content from multiple sources can be combined to create new, yet secure, function; digitally signed executable content can bypass some security restrictions; and, nominally shared resources are managed via policies associated with the content loading mechanism.

30 Claims, 13 Drawing Sheets

MULTIPLE RESOURCE OR SECURITY CONTEXTS IN A MULTITHREADED APPLICATION

CROSS REFERENCE TO RELATED APPLICATIONS

The present application related to the following co-pending patent applications: U.S. patent application Ser. No. 08/661517, filed Jun. 11, 1996, by Dan, et al., entitled "Support for Portable Trusted Code," and U.S. patent application Ser. No. 08/661687, filed Jun. 11, 1996, by Islam, et al., entitled "A Uniform Mechanism for Using Signed Content".

These co-pending applications are commonly assigned to the assignee of the present application, International Business Machines Corporation, of Armonk, N.Y., and are hereby incorporated by reference herein in their entirety.

BACKGROUND

1. Field of the Invention

The present invention relates to computer mechanisms for safely executing software which has been obtained over a network or other means.

2. Related Art

In order to increase the utility of networked computers, methods have been sought to allow them to execute programs obtained from servers. The primary advantage of such a system from the user's view point is that it decreases the amount of software that must be stored on the user's computer. From the software developers viewpoint, the system has a number of advantages, a main one being that the program provider has greater control over the distribution of the programs. The use of downloadable executable programs such as Sun Microsystems' embedded Java Applets in World Wide Web documents is a popular example of such a system.

A significant concern with this approach is that the software obtained from the server may be malicious and damage the user's computer or steal data (see McGraw & Felten[3], pages 28–33). Downloaded software must therefore be executed in a controlled environment in which they are given only the system resources that they need and no more.

A main problem with the current Java security mechanism is that it is not flexible enough. A single Java program can be an Applet, or an application (more general programs written in the Java language), or both. All Java Applets are considered hostile and are not allowed to access most resources on the user machine's operating system (see McGraw & Felten, pages 54–55; and Flanagan[15], pages 211–213). Alternatively, Java applications are considered completely trustworthy and may fully exploit any and all of the system resources.

Designing flexible security policies in the Java Application Environment (JAE) is limited by the design of allowing only a single System SecurityManager to be set during an instantiation of the JVM (see Chan & Lee', page 1188). This limitation restricts the JVM to a single system-wide security policy, though it can be customized somewhat through the use of Access Control Lists (ACL's). Although the JAE now allows more than one SecurityManager to be created, the need remains for an improved method and flexible structure which supports multiple security policies in a single instance of the JVM. The present invention addresses such a need.

A number of computer operating system use capabilities to control access to system resources. A capability is a permission held by a process to perform some action on another object or resource. Notable operating systems that use capabilities for enforcing security are CMU Hydra OS[4], Amoeba[11] and Mach[12]. Notable computers with such capabilities include the Burroughs 5700/6700[5], IBM System 38[6], Cambridge Capability Computer[7,8], and the Intel 432[9], among others[10]. A problem with this approach is that once a process obtains a capability, it has unrestricted permission to perform actions on the object or resource. By themselves, capabilities do not permit selective constraints on access to objects and resources based on their current operating context. That is, capabilities illicitly or surreptitiously obtained will allow access to objects and resources which a process should not have access.

In the Java Application Environment, it is currently presumed that system-wide resources are shared by all application code. If more than one application attempts to share a system-wide resource, then there is a potential for conflicts, with the possible effect of obtaining incorrect or incomplete results. The present invention includes features which avoid these conflicts.

A number of computer operating systems create virtual machines (VMs) to give a program the illusion that it has access to all of the systems hardware and/or software features. Notable examples include IBM's VM/SP operating system, and the PC-DOS emulation under IBM's OS/2 and Microsoft's Windows operating systems. These systems primarily attempt to emulate existing computer hardware features, and apply security features as a secondary consideration.

III. SUMMARY OF THE INVENTION

In accordance with the aforementioned needs, the present invention is directed to a method and system which enables multiple resource or security contexts in a multithreaded application environment, such as Java.

A computerized method of supporting multiple security or resource contexts having features of the present invention includes the steps of: instantiating at least one thread for an execution of the content, each thread having at least one content context; associating each content context with a content loader for loading each context for execution; associating the loader with a security requirement and/or a resource requirement, wherein the associated requirement may vary according to each content context; and dynamically managing a security request and/or a resource request for each thread according to the associated requirement.

A content usage system having features of the present invention may include: a content importation mechanism, connected to a context extraction mechanism, connected to a content verification mechanism, connected to a content interpreter and a system enforcement module (also called a system security manager). According to another aspect of the present invention, instances of security enforcement modules (also called security managers) can be attached to the content importation mechanisms such that the system enforcement module can redirect system security enforcement requests to the security managers. A key advantage of this feature is the association between the imported content and the security managers in a way that can be dynamically and flexibly exploited by the system security enforcement module.

In accordance with yet another aspect of the present invention, the content usage system receives content from a content provider. The content may include a list of security requirements, resource requirements, executable content, and a digital signature to verify the authenticity of the content provider and integrity of the content. A key advantage of this aspect of the invention is that the scope of security enforcement can effectively be limited, thereby allowing operations on resources which would not otherwise be allowed.

In accordance with still another aspect of the present invention, the Content Usage System can virtualize shared system resources in a way that gives application code the illusion that it has full and unshared access to shared system resources. The illusion is created by creating instances of the shared resources and attaching the resources to an application's thread, thread (process) group or security manager. A key advantage of this aspect of the invention is that nominally shared resources may be virtualized by the security manger, in addition to virtualization at the thread or process level.

IV. BRIEF DESCRIPTION OF THE DRAWINGS

These and other improvements are set forth in the following detailed description. For a better understanding of the invention with advantages and features, refer to the description and to the drawings, wherein.

DETAILED DESCRIPTION

Figure 1:
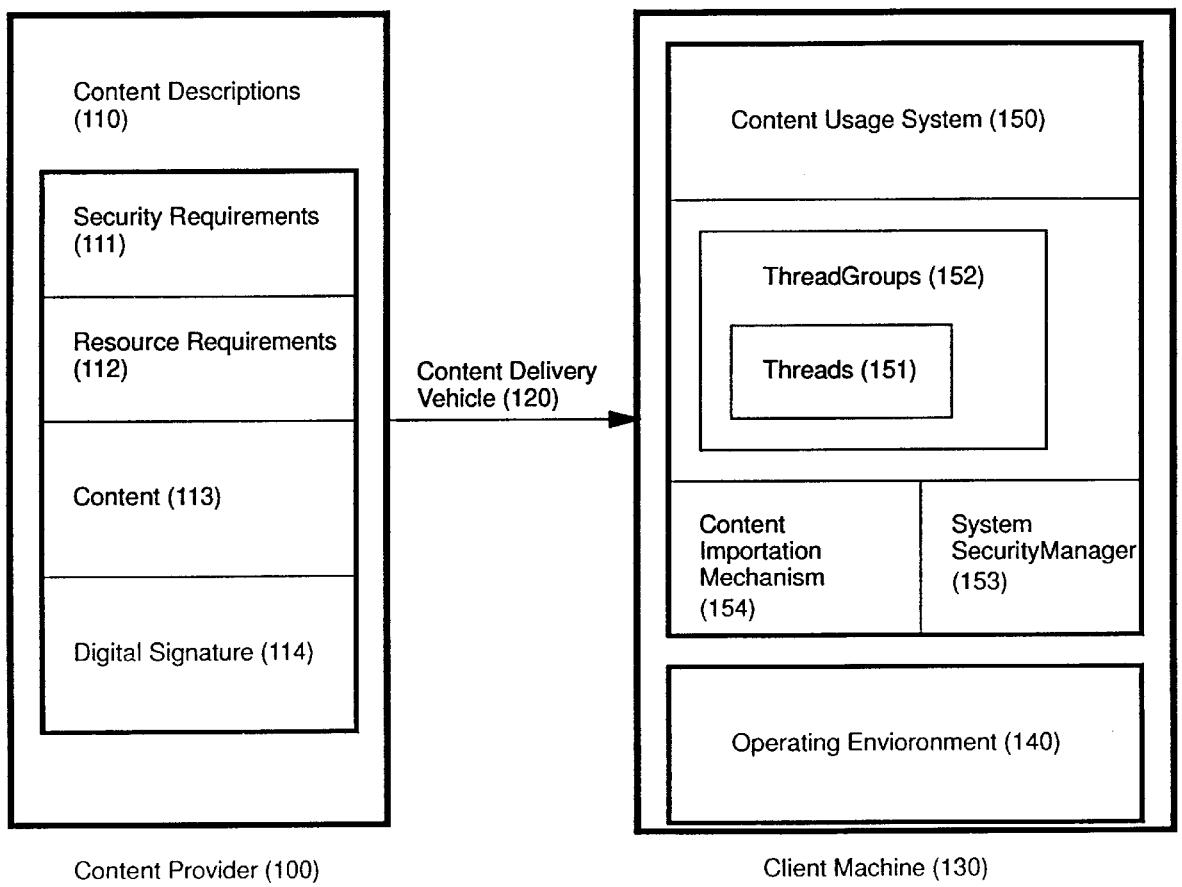
FIG. 1 shows a prior art system for executing downloadable content.

FIG. 1 depicts a prior art system for executing downloadable content. As depicted, a Content Provider 100 delivers Content Descriptions 110, consisting of one or more of Security Requirements 111, Resource Requirements 112, Contents 113, and Digital Signature 114. Content Providers 100 may include World Wide Web servers, files in a disk, diskette, file system and CD-ROM. Security Requirements 111 may include restrictions on access to system and network resources. Resource Requirements 112 may include quantity of, and rates of usage of, system and network resources. Resources include, but are not limited to, I/O, memory, and processor time. Content 113 includes programs and data. Data includes, but is not limited to, audio, video and other multimedia. The Digital Signature 114 should reliably and securely identify the provider of the content.

A Content Delivery Vehicle 120 includes means by which the Content Descriptions 110 can be transmitted from the Content Providers 100 to the Content Usage System 150. The Content Delivery Vehicles 120 may include digital networks, such as the Internet and World Wide Web, networked file systems, and digital storage media such as diskettes, magnetic tapes and CD-ROM, and may include using communication protocols such TCP/IP, SNA, IPX, AppleTalk, NetBIOS, and BIOS.

The Client Machine 130, which can be any computer, microprocessor or CPU-based device with sufficient memory to run an Operating Environment 140 and Content Usage System 150. By way of example only, the Operating Environment 140 may be an operating system, such as IBM's OS/2, MVS, Microware's OS/9000, PC-DOS, Unix, Microsoft Windows NT or CE, and Sun's JavaOS. In a preferred embodiment, the Content Usage System 150 is typified by a Java Virtual Machine[13,14], and World Wide Web browsers. As is conventional, the Operating Environment 140 is able to communicate with the Content Providers 100 and receive Content Descriptions 110 through the Content Delivery Vehicle 120. The Content Usage System 150, running in cooperation with the Operating Environment 140, is able to receive Content Descriptions 110 via the Operating Environment 140. In the Java Application Environment, the Content Usage System 150 contains a number of elements, including Threads of execution 151 (see Chan & Lee[1], page 1358), collections of Threads called ThreadGroups 152 (see Chan & Lee[1], page 1385), a system-wide security enforcement module called a System SecurityManager 153 (see Chan & Lee[1], page 1188), and a Content Importation Mechanism 154. The Content Importation Mechanism 154 uses well known techniques to establish a bridge between a Content Delivery Vehicle 120 and a Content Extractor 211 for the delivery of Content Descriptions 110. The Content Importation Mechanism 154 receives Content Descriptions 110 from the Content Provider 100 via the Operating Environment 140.

Figure 2:
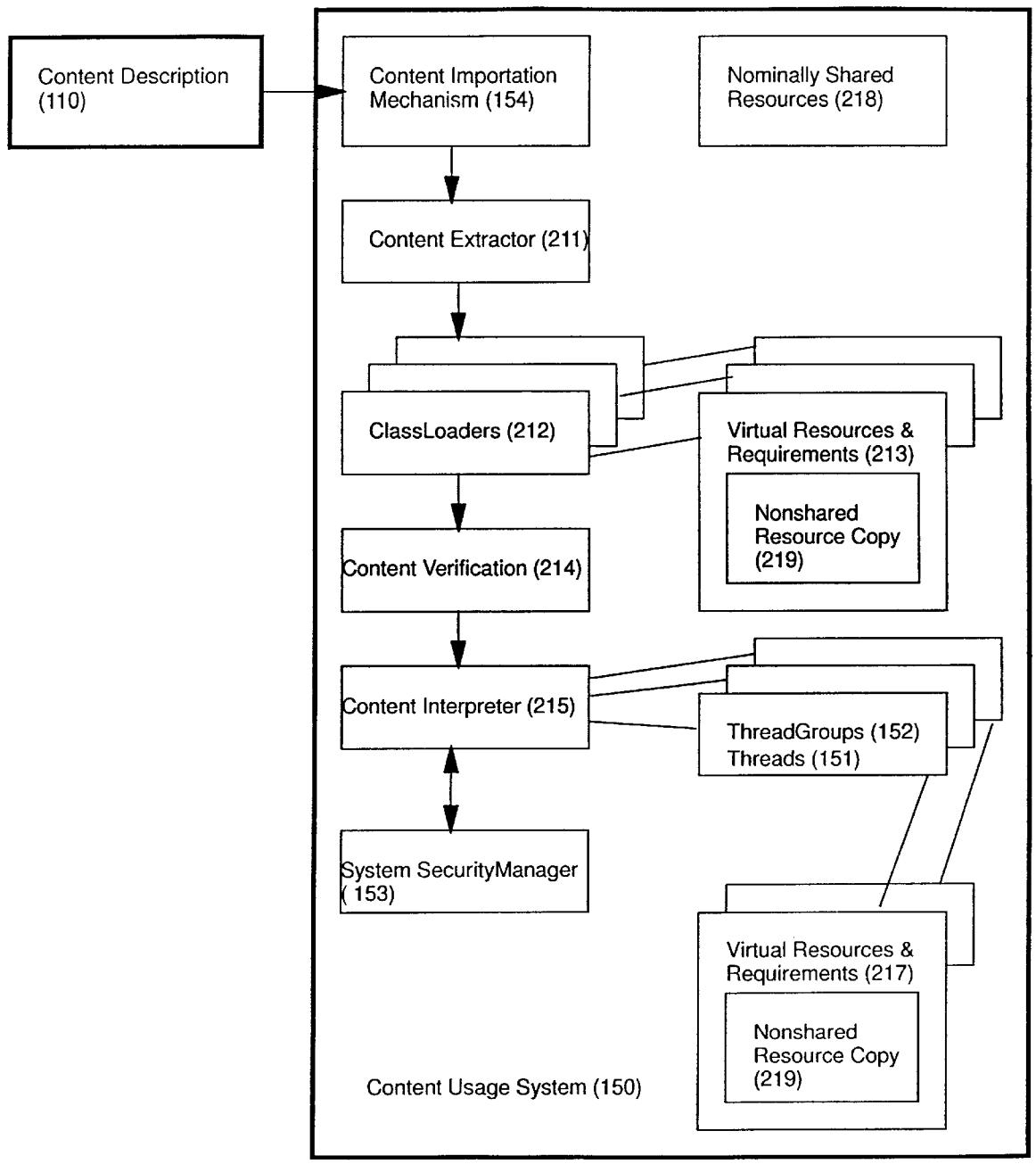
FIG. 2 shows a Content Usage System for downloadable executable content, having features of the present invention embodied in the Java environment.

FIG. 2 depicts an example of the Content Usage System 150 having features of the present invention as embodied in the Java environment. As depicted, the Content Description 110 is received by the Content Usage System 150 via the Content Importation Mechanism 154. Each Content 113 may be contained in a Content Description 110 and loaded into the Content Usage System 150. As is conventional, the Content 113 may be extracted from the Content Description 110 by a Content Extractor 211, and may be instantiated in the Content Usage System 150 by a ClassLoader 212. The ClassLoader 212 (see Chan & Lee[1], page 213) takes the Content 113 and passes it to the Content Verification 214 to do static verification that the Content 113 does not violate system security requirements (see McGraw & Felten, pages 37–43). Content 213 that succeeds in passing through the Content Verification 214 stage is allowed to be instantiated and executed by the Content Interpreter 215[13].

One skilled in the art would realize that within the spirit and scope of the present invention, loadable content could be adapted to other environments, such ActiveX, or OMG's CORBA and IIOP, where the loadable content is executable.

According to the present invention each ClassLoader 212 instance may be associated with a set of Virtual Resources & Requirements (VRR) 213. As will be discussed in more detail with reference to FIGS. 10a and 10b, the VRR 213 may include Nonshared Resource Copies 219 of Nominally Shared Resources 218. As will be discussed in more detail with reference to FIG. 5, the VRR 213 may also include Security Requirements 111 and Resource Requirements 112 associated with the Content 113. The Nominally Shared Resources 218 may include, but are not limited to, SecurityManagers 513, windowing system state, file system state, and default system parameters. The set of Virtual Resources & Requirements associated with a ClassLoader 212 may be null, e.g., represent an unrestricted security access.

During Content Interpreter 215 execution, all security verification requests may be made through calls to the System SecurityManager 153. As will be described in more detail with reference to FIGS. 7 and 8, the present invention has features which provide a new, dynamically defined security policy. By way of overview, security and/or resource enforcement requests may be redirected from the System SecurityManager 153 to instances of enforcement modules (also called SecurityManagers) which may be indirectly attached to the Content Importation Mechanisms 154. For example, the SecurityManagers may be associated with the loaded Content 113 via the ClassLoaders 212. Thus, the security requirements for the Contents 113 does not need to be known at Content Usage System 150 initialization. The resulting security policy is a flexible composition of the security policies (SecurityManagers), of each of the Contents 113 loaded into the Content Usage System 150.

Referring again to FIG. 2, during Content Interpreter 215 execution, one or more Threads 151 and ThreadGroups 152 are created during execution of the Content 113 (see Lea$^2$, pages 1–27). According to yet another aspect of the present invention, (as will be discussed in more detail in FIG. 5) each Thread 151 and/or ThreadGroup 152 may also be associated with a set of Virtual Resources & Requirements 217 similar to the aforementioned Virtual Resources & Requirements 213. One skilled in the art will appreciate that within the scope and spirit of the present invention, the Virtual Resources and Requirements 217 could be merged into Threads 151 and ThreadGroups 152, resulting in fewer classes in the Content Usage System 150.

Figure 3:
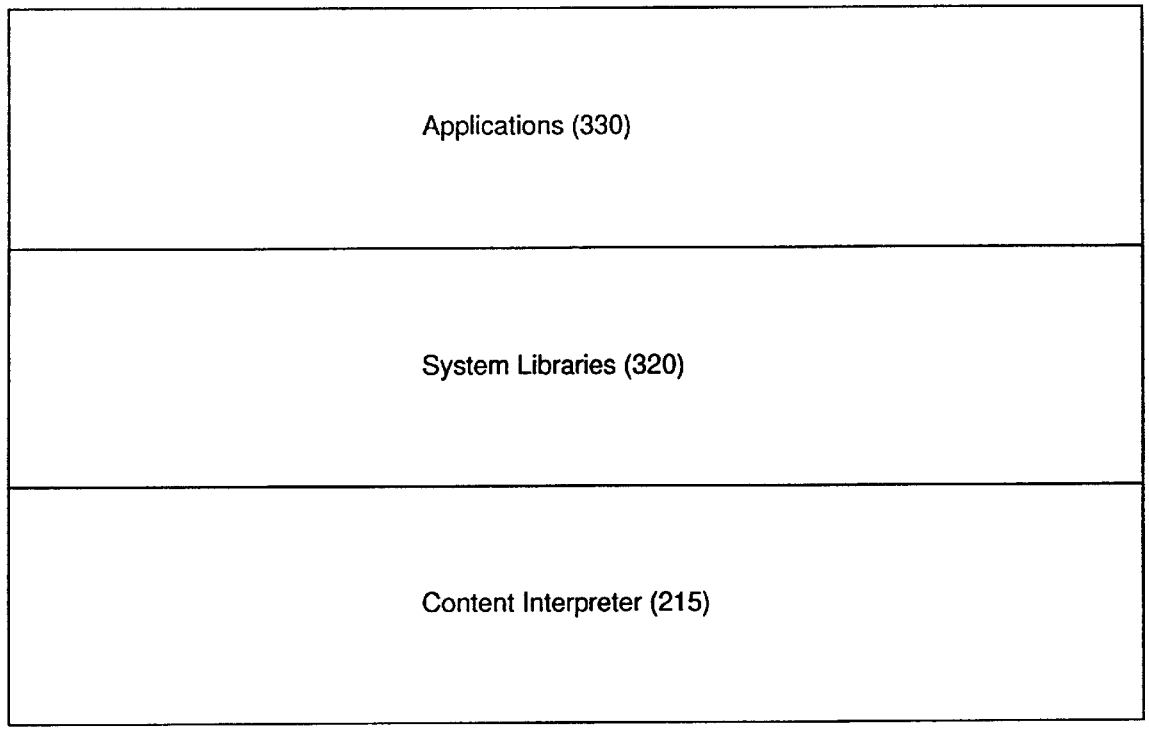
FIG. 3 shows an example layering of the Content Usage System.

FIG. 3 depicts an example layering of the Content Usage System 150. As depicted, the system includes the Content Interpreter 215, System Libraries 320, and Applications 330. The Content Interpreter could be a language-based system such as the Java Virtual Machine[13], or computer hardware running machine instructions. Applications 330 makes calls to System Libraries 320 during execution. The Applications 330 and the System Libraries 320 run on top of the Content Interpreter 215.

Figure 4:
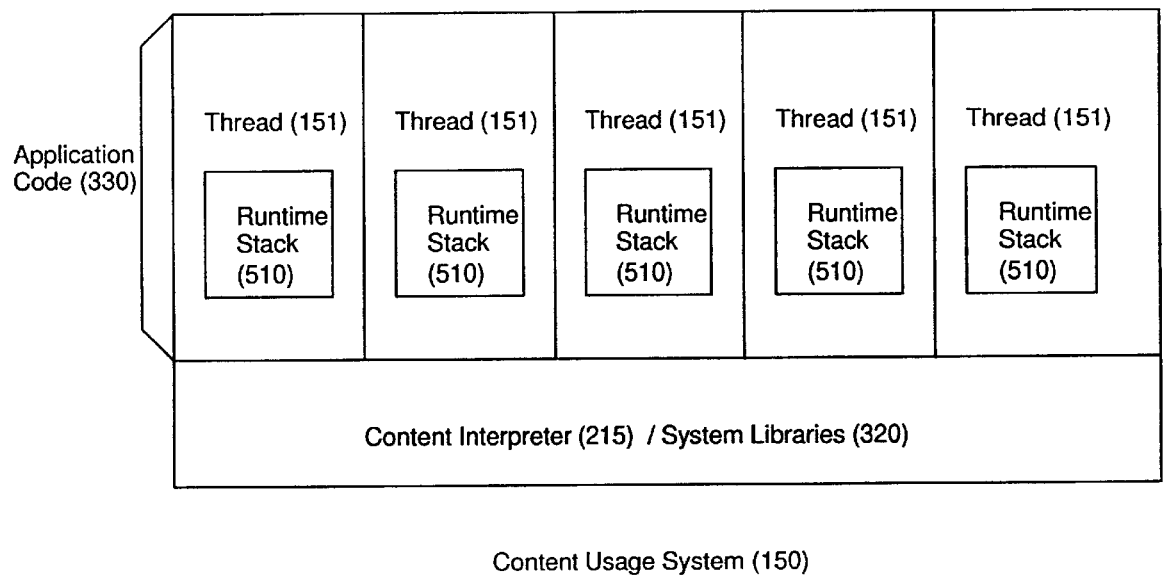
FIG. 4 shows a different view of the Content Usage System.

FIG. 4 depicts another view of the Content Usage System 150. As depicted, the Applications 330 run in Threads 151 on top of the System Libraries 320 and the Content Interpreter 215. As is conventional, the Content Usage System may have multiple concurrent running Threads 151, although only one Thread 151 may be actually running at any instant of time. The Content Interpreter 215 and the System Libraries 320 manage the execution of the Threads 151 by allotting processing time and other system resources to the Threads 151 running the Applications 330.

Figure 5:
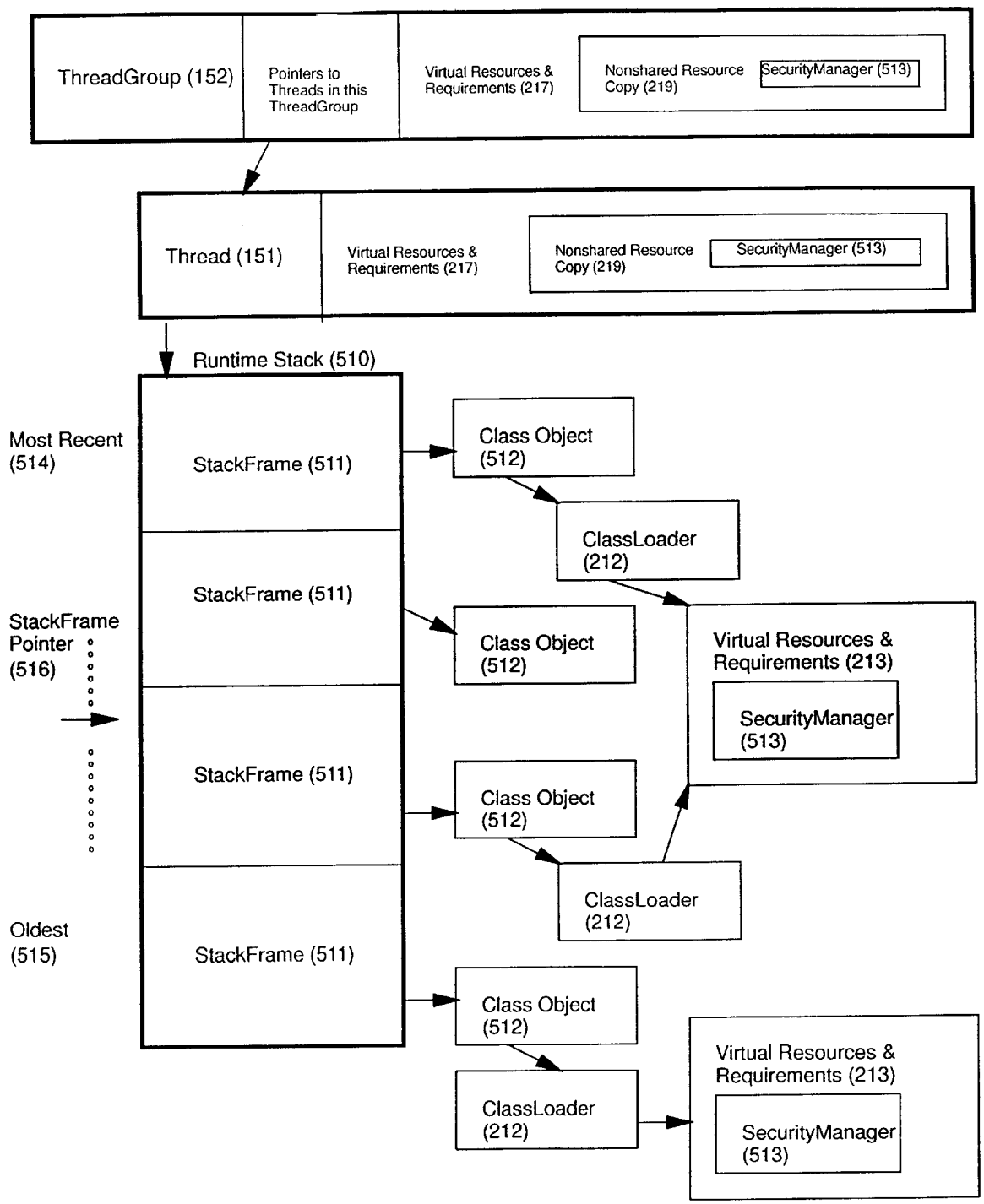
FIG. 5 shows the relationship between runtime elements associated with a Thread.

FIG. 5 depicts an example of the Content Usage System 150 having features of the present invention, and in particular the relationship between runtime elements associated with the Threads 151. In the Java Application Environment (JAE) [14,15] depicted, each Thread 151 is associated with a Runtime Stack 510 for the Thread 151. The Runtime Stack 510 includes a number of Stack Frames 511, representing uncompleted method/subroutine calls in the Thread 151. Each StackFrame 511 represents an instance of a class. An object can be interrogated to get its class description called a Class Object 512 (see Chan & Lee[1], page 200 and page 1017). The Class Object 512 may be interrogated to find its ClassLoader 212 (see Chan & Lee[1], page 200). According to the present invention, a reference is added from the ClassLoader 212, used to load the class into the Content Interpreter 215, to a set of Virtual Resources and Requirements 213 that may be associated with the StackFrame's class object. One of these Virtual Resources 213 may be a SecurityManager 513 used to verify and/or enforce Security Requirements 111 for this class and all of its instances. More detailed examples of how a SecurityManager may be obtained from a currently executing Thread 151 and used to verify and/or enforce security and manage Resource Requirements 112 constraints will be described in FIGS. 7, 10a and 10b. As will be discussed in more detail with references to FIGS. 10a and 11, Nonshared Resource Copy 219 may be associated with each Thread 151 and /or ThreadGroup 152.

One skilled in the art will appreciate that, although they are shown separately the ClassLoader 212, Virtual Resources & Requirements 213 and SecurityManager 513 could be merged into one or more objects within the spirit and scope of the present invention.

Figure 6:
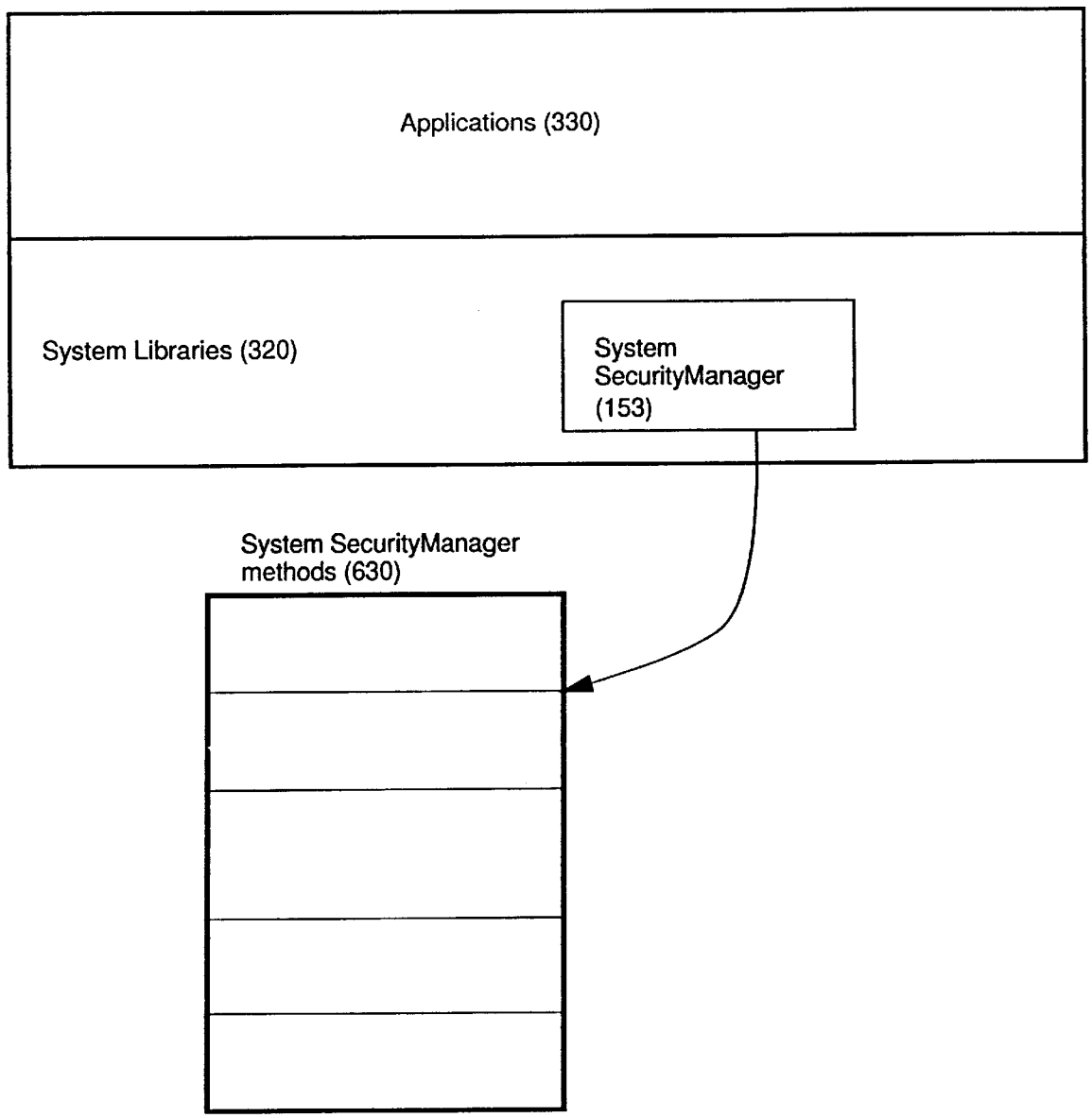
FIG. 6 shows how Content, System Libraries and a System SecurityManager are related.

FIG. 6 shows how a Java Virtual Machine implementation of a Content Interpreter 215 uses the System SecurityManager 153. As Applications 330 are executing, calls are made to methods in System Libraries 320, which make calls to System SecurityManager methods 630 in the System SecurityManager 153. The specific methods 630 associated with the System SecurityManager 153 can determine how to respond to security verification requests.

Figure 7:
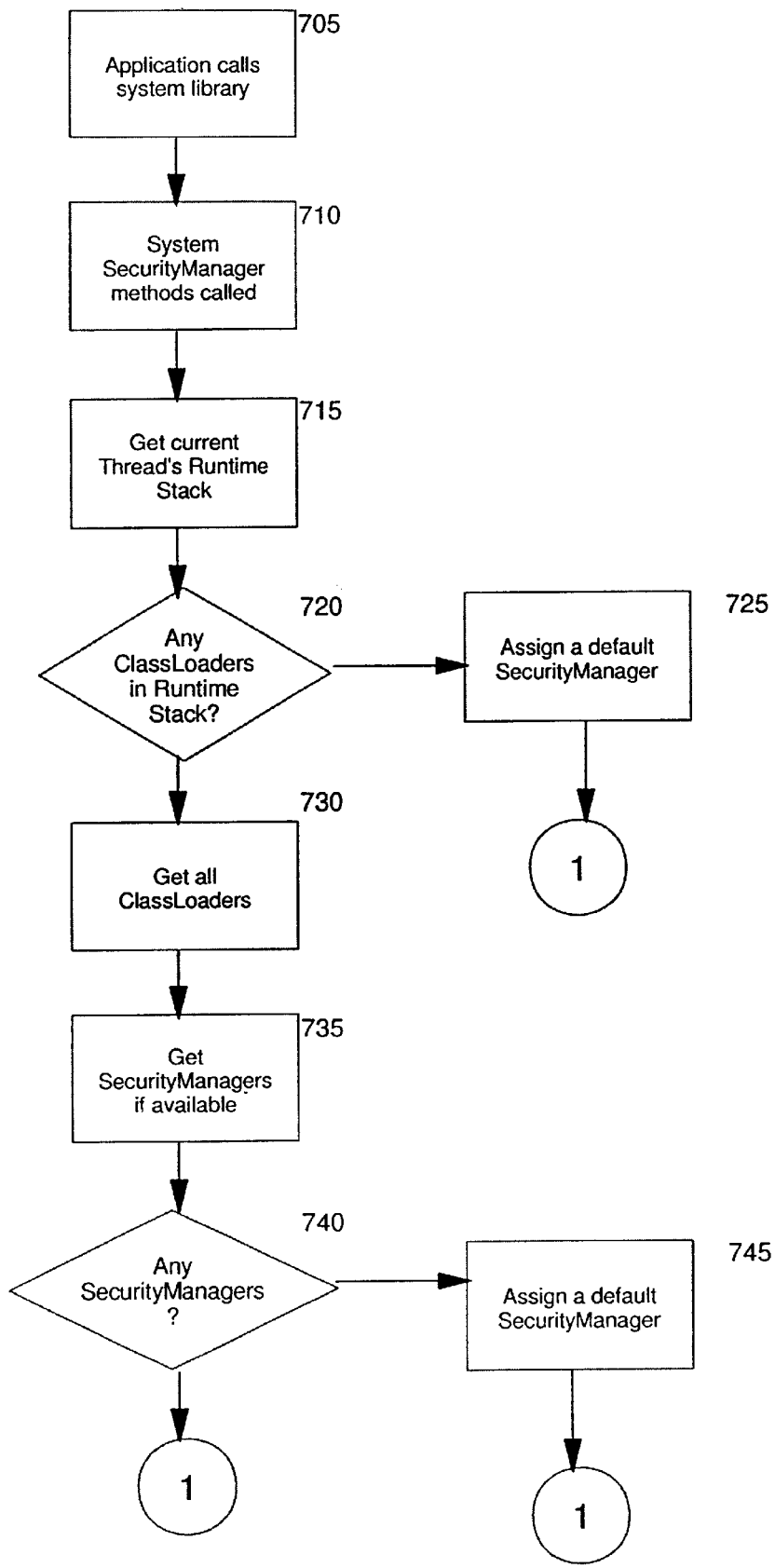
FIG. 7 shows an example of the logic flow during security enforcement during Content execution.
Figure 8:
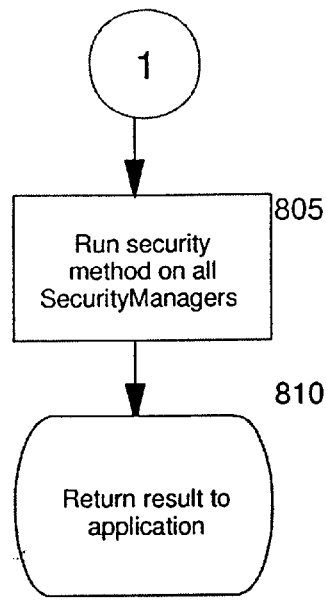
FIG. 8 shows an example of the logic flow during security enforcement during Content execution.

FIGS. 7 and 8 depict examples of methods having features of the present invention. By way of overview, a system enforcement module such as the System Security Manager 153, redirects enforcement requests to instances of enforcement modules such as SecurityManagers 513 which may be (indirectly) attached to the Content Importation Mechanism 154. In contrast to prior art systems, which use a single System SecurityManager 153 or Access Control Lists (ACL's) to determine the security policies of the system, one or more SecurityManagers 513 are used to create a dynamic and flexible security policy. In addition, the SecurityManagers 513 may be associated with the ClassLoaders 212, as well as with Threads 151, ThreadGroups 152 (processes), or users of the system.

FIG. 7 depicts a logic flow chart for obtaining SecurityManagers 513 from the currently executing Thread 151 in a Java Application Environment. In step 705, the Applications 330 running in the Content Interpreter 215 call the System Libraries 320. In step 710, the System Libraries 320 methods call the System SecurityManager methods 630 to verify security and resource constraints. The caller of the System SecurityManager 153, and the arguments to the System SecurityManager's methods 630 are preferably remembered for later use. In step 715, the System SecurityManager 153 gets the current Thread's Runtime Stack 510. In step 720, all StackFrames 511 in the Thread's Runtime Stack 510 may be checked to see if any ClassLoaders 212 are present for any of the Class Objects 512. In step 725, if no ClassLoaders 212 are found, a default SecurityManager 513 is added to an empty list of SecurityManagers (to be checked in step 805 of FIG. 8). If any ClassLoader was found in step 720, then in step 730 the ClassLoader 212 is obtained from each Class Object 512 for each StackFrame 511 in the current Thread's Runtime Stack 510. In step 735, a check is made through each ClassLoader 212 to see if a SecurityManager 513 is available from the Virtual Resources & Requirements 213 associated with ClassLoader 212. If so, the SecurityManager 513 may be saved on a list (to be used in step 805 of FIG. 8). In step 740, if no SecurityManagers were found in step 735, then in step 745, a default SecurityManager may be assigned to the list (to be used in step 805 of FIG. 8). Otherwise, after step 740 the process may continue with step 805 of FIG. 8. After completing steps 725 and 745, the process may also continue with step 805 of FIG. 8.

The output of the logic at steps 725, 740 and 745 is a list of SecurityManagers 513 that may be used for flexibly enforcing security policies in the current Thread 151.

One skilled in the art will appreciate that within the scope and spirit of the present invention, the default SecurityManager 513 saved on the list in step 725 need not be the same, nor implement the same security policies as the default SecurityManager 513 saved on the list in step 745.

FIG. 8 depicts an example of an extension to the process depicted in FIG. 7. In step 805, the System SecurityManager 153 uses the SecurityManager list created in steps 725, 735 and 745. The System SecurityManager 153 walks through this list of SecurityManagers 513, plus a list of SecurityManagers 513 (if any) attached to Threads 151 and ThreadGroups 152 as depicted in FIG. 5, and calls the same System SecurityManager method 630 that was used to call the System SecurityManager 153 in step 710, with the same arguments passed in that method call. In Step 810, the most secure, or restrictive, result may be returned to the method that called the System SecurityManager 153.

The logic depicted in FIG. 7 and FIG. 8 has thus created a new, dynamically defined, security policy. The policy is a composition of the security policies (SecurityManagers 513), of each of the Contents 113 loaded into the Content Usage System 150. One of the novel features is that the SecurityManagers 513 may be attached (indirectly) to the ClassLoaders 212 of the loaded Content 113. Thus, the security requirements for the Contents 113 does not need to be known when the Content Usage System 150 is started. The security policies, as typified by SecurityManagers 513, can be added to the Content Usage System 150 on an incremental, or as needed, basis. These policies may be defined by system administrators or Content 113 authors, or others, and packaged into Content Descriptions 110.

Figure 9:
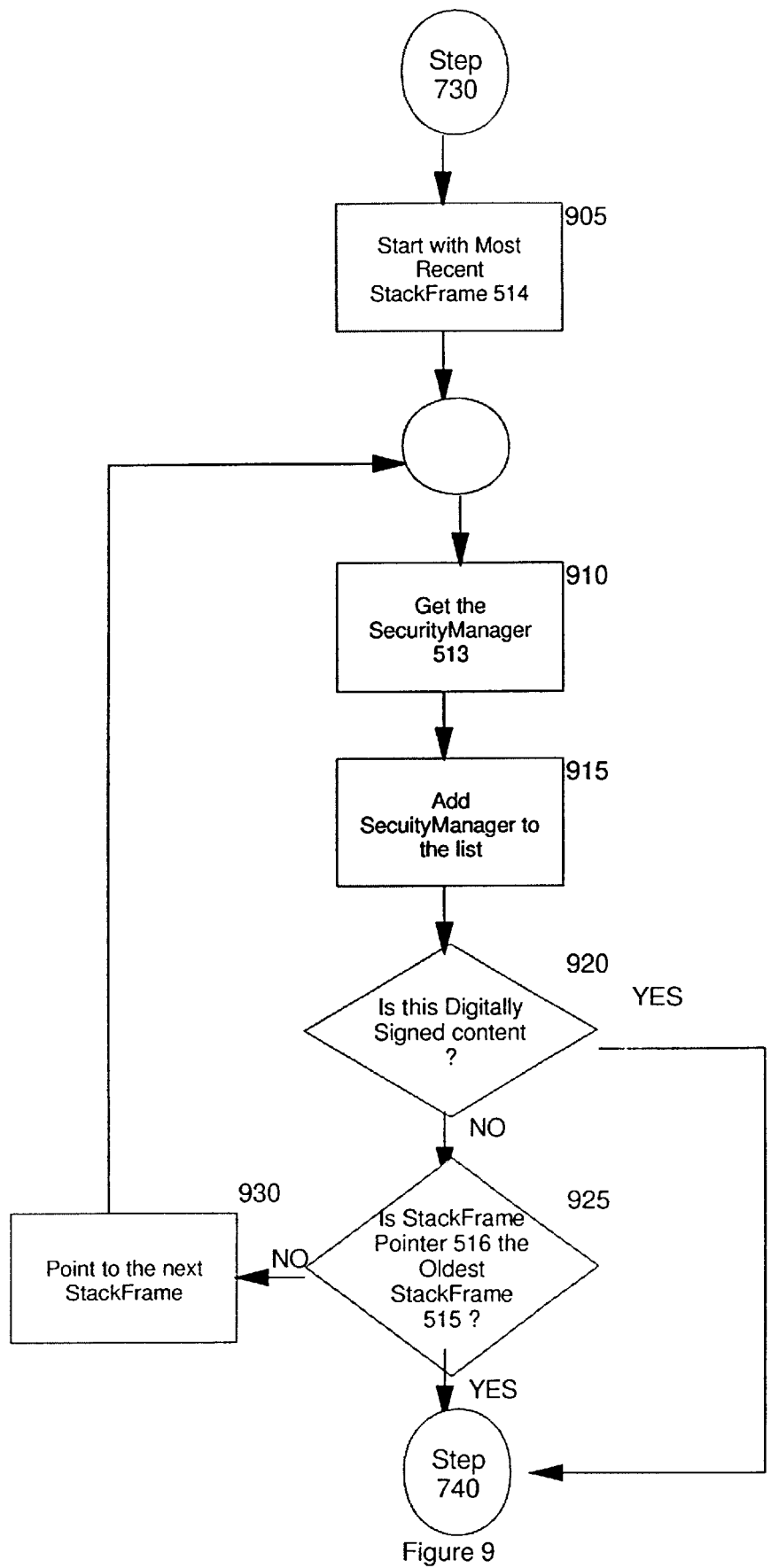
FIG. 9 shows a modified logic flow when the Content contains a Digital Signature.

FIG. 9 describes an example of a logic flow chart having features of the present invention whereby the Content Description 110 can effectively constrain security policy checking. In particular, FIG. 9 describes an example of how a restriction can be placed on the range of SecurityManagers 513 checked by the System SecurityManager 153. Steps 905 through 930 represent a more detailed example of step 735 in FIG. 7. In step 905, a StackFrame Pointer 516 is set to point to the Most Recent StackFrame 514 on the Runtime Stack 510 for the current Thread. In step 910, the SecurityManager 513 associated with the class currently being checked on the Runtime Stack is obtained, if available. In step 915 the SecurityManager 513, if available, may be saved on the list to be used in step 805 of FIG. 8. In step 920, a check may be made to see if the class represented in the current StackFrame 511 has a Digital Signature 114. Examples of the use of Digital Signatures are described in the aforementioned "Support for Portable Trusted Software," by Dan, et al., and "A Uniform Mechanism for Using Signed Content," by Islam, et al. If a Digital Signature is found, the process continues at step 740 in FIG. 7. In step 925, a check is made to see if the StackFrame Pointer 516 to a StackFrame 511 is at Oldest 515 in the Runtime Stack 510 of the current Thread. If so, then proceed to step 740 in FIG. 7. Otherwise, the StackFrame pointer is moved to the next StackFrame 511 in the Runtime Stack for the current Thread, moving towards the Oldest 515 StackFrame. Execution continues with step 910.

The net result of the logic outlined in FIG. 9 is that fewer SecurityManagers 513 may be checked for security policies. An advantage afforded by limiting the range of SecurityManagers to be checked is that some Content 113 is presumed to be trusted. Trusted content may thus be allowed to execute functions which would otherwise be restricted by the SecurityManagers 513 found further down in the Runtime Stack 510. The process outlined in FIG. 9 presumes that the Content 113 is to be trusted, which is why a security mechanism such as the Digital Signature 114 is suggested.

Figure 10A:
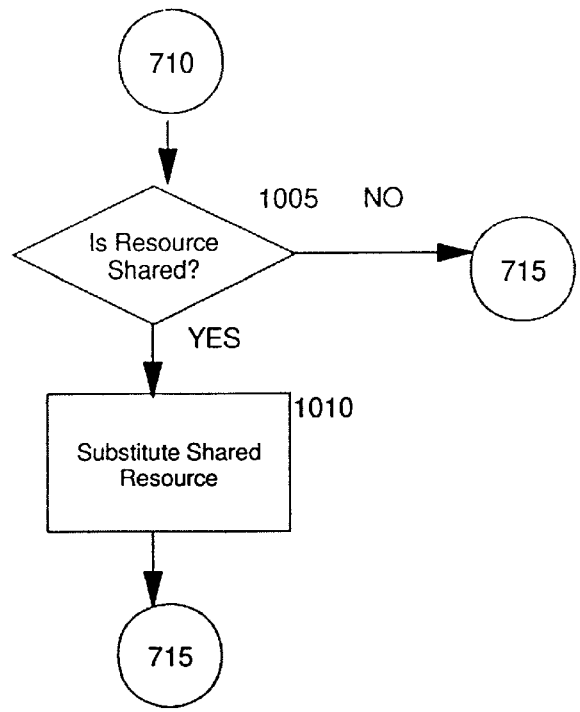
FIG. 10a shows a modified logic flow when Nominally Shared Resources are virtualized.
Figure 10B:
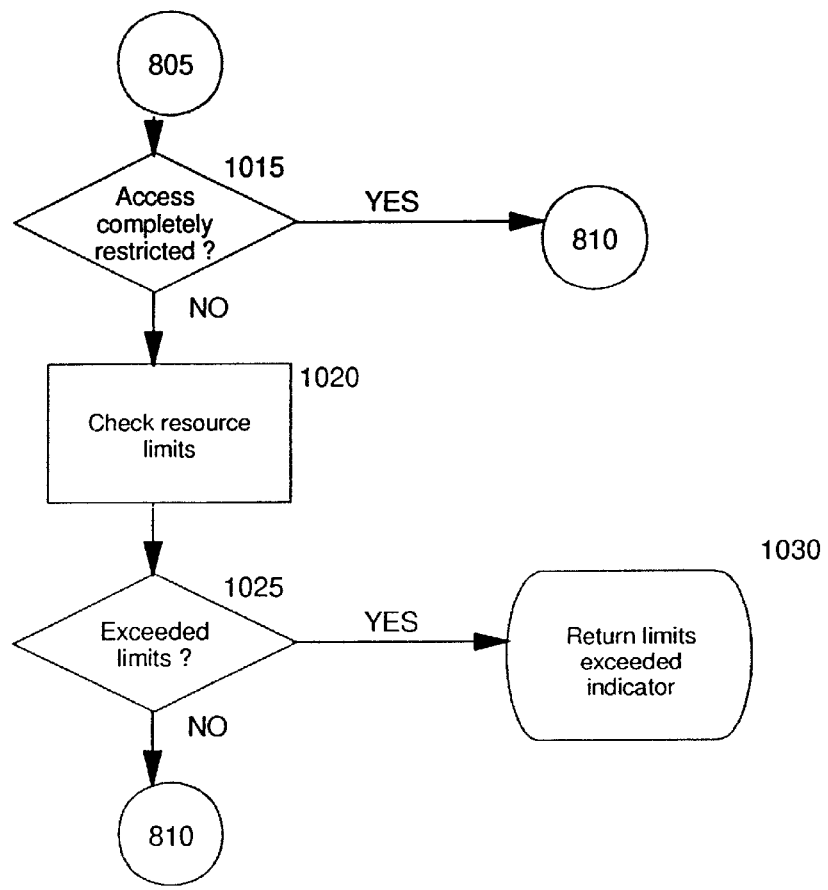
FIG. 10b shows a modified logic flow when Nominally Shared Resources are virtualized.
Figure 11:
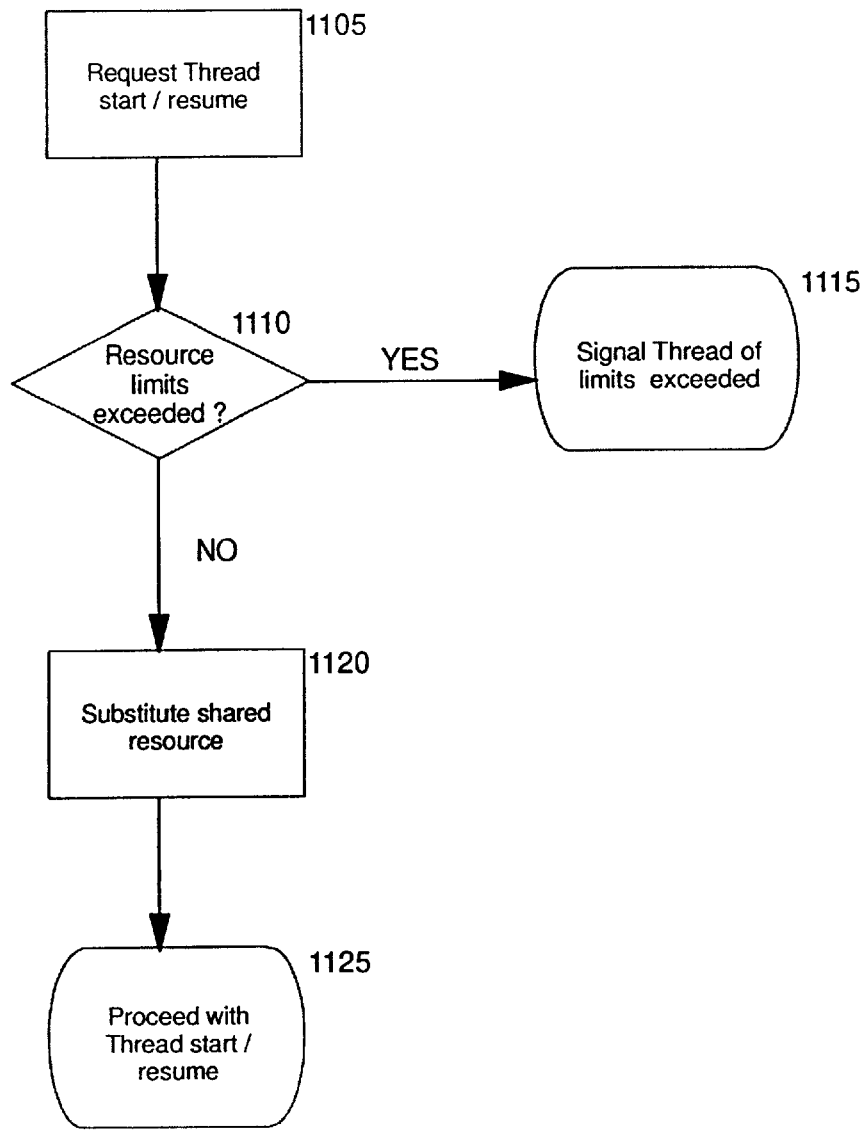
FIG. 11 shows a modified logic flow during Thread startup/resumption.

FIG. 10a, FIG. 10b and FIG. 11 describe examples of still further aspects of the current invention whereby nominally shared system resources may be virtualized to give Threads the illusion that they have full unshared use of parts of the Content Usage System. As previously noted in FIG. 2 and FIG. 5, the present invention extends the Content Usage System 150 to include Virtual Resources & Requirements 213 and 217.

FIG. 10a adds extra steps between steps 710 and 715 of FIG. 7. Step 710 is followed by step 1005. In step 1005, a determination may be made as to whether the resource to be accessed by the Application 330 is a Nominally Shared Resource 218 shared by all Applications 330 in the Content Usage System 150. If not, execution resumes with step 715 of FIG. 7. If the resource is one of a Nominally Shared Resource 218, and where possible, the Nominally Shared Resource 218 may be replaced with a Nonshared Resource Copy 219 of the resource. The Nonshared Resource Copy 219 of the resource may be kept in Virtual Resources & Requirements 213. Execution resumes with step 715 of FIG. 7.

In FIG. 10b, extra steps have been added between steps 805 and 810 of FIG. 8. In step 1015, a check is made for resource access restrictions from step 805. If access is completely restricted, proceed to step 810. In step 1020, look up the resource limits in the Virtual Resources & Requirements 213. Resource limits may include, but are not limited to, restricting the number of open files, open network connections, and processes running external to the Content Usage System 150. In step, 1025 test for resource limits being exceeded. If the resource limits have been exceeded, step 1030 may return to the method that called the System SecurityManager 153 with an indication that resource limits were exceeded. If resource limits were not exceeded, execution resumes with step 810 of FIG. 8.

As opposed to prior art, which does virtualization at the process or user level, the present invention advantageously applies resource virtualization via the SecurityManager 513 which is associated with a ClassLoaders 212. Another advantage is the testing of resource use limits is via the SecurityManager 513 associated with the Content 113, rather than through a single system-wide SecurityManager 153. Because content is dynamically loadable, and may be coming from one or more Content Providers 100, and because the System SecurityManager 153 is called when any of a number of system resources are accessed by the System Libraries 320 during Application Code 330 execution, a SecurityManager 513 associated with a ContentLoader 212 is an improved control point for performing virtualization of system resources.

As is conventional, the Applications 330 create Threads 151 and ThreadGroups 152 in order to execute Content 113. These Threads 151 and ThreadGroups 152 are created, paused and resumed by the Content Usage System's 150 Content Interpreter 215 and System Libraries 320 and Application Code 330.

FIG. 11 depicts an example of a method creating, pausing and resuming Threads 151 in accordance with the present invention. The logic of FIG. 11, may be included as additional steps to the Content Interpreter 215 Thread scheduling routine in the Content Usage System 150. As depicted, when a Thread 151 is ready to start or resume execution, step 1105 is inserted into the process before the Thread 151 is prepared to execute. In step 1105, the Thread 151 receives a start/resume request. In step 1110, a check may be made in the Virtual Resources & Requirements 217 for resource limits that may have been exceeded by the Thread 151. In step 1115, if any resource limits have been exceeded, a signal may be sent to the Thread 151 and/or ThreadGroup 152 that have exceeded their resource limits. It may be the responsibility of the Thread 151, ThreadGroup 152, or the Thread that created Thread 151 and ThreadGroup 152 to handle the error condition. If resource limits have not been exceeded, then step 1120 substitutes Nominally Shared Resources 218 with Nonshared Resource Copies 219. The reference to the non-shared copies of the resources may be kept in Virtual Resources & Requirements 217. In step 1125, the process continues with the starting or resuming execution of the Thread 151.

Figure 12:
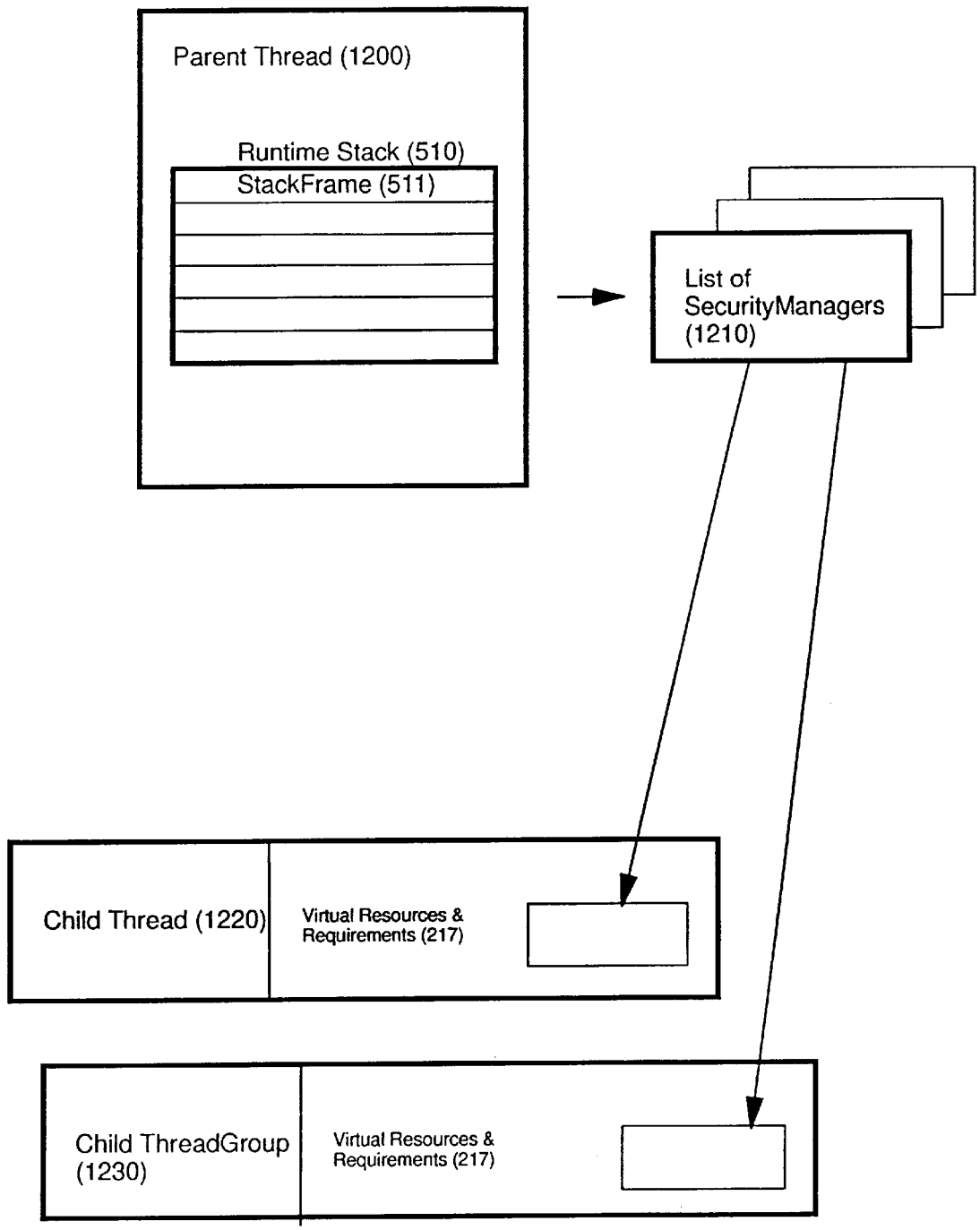
FIG. 12 shows an example of an association of Threads and/or Threadgroups with security and resource requirements having features of the present invention.

FIG. 12 depicts an example of a Thread and the Threads/ThreadGroups it has created. As is conventional, new Threads 151 and ThreadGroups 152 (children) create new Runtime Stacks 510, and often do not contain the Stack-Frames 511 of the Thread 151 (parent) that created it. Some systems may desire to attach security policies associated with the parent Thread 151 with the child Threads 151 and ThreadGroups 152. Content 113 running in the child Thread 151 or ThreadGroup 152 may not use any Content 113 that had been running in the parent Thread 151 when the child Thread 151 or ThreadGroup 152 was created.

The Parent Thread 1200 has a Runtime Stack 510. According to the present invention a SecurityManager is associated with each StackFrame 511 as described in FIG. 5. FIGS. 7, 8, and 9 describe how to retrieve the SecurityManagers and create a List of SecurityManagers 1210. The List of SecurityManagers 1210 may be associated with Child Thread 1220 and Child ThreadGroup 1230.

Figure 13:
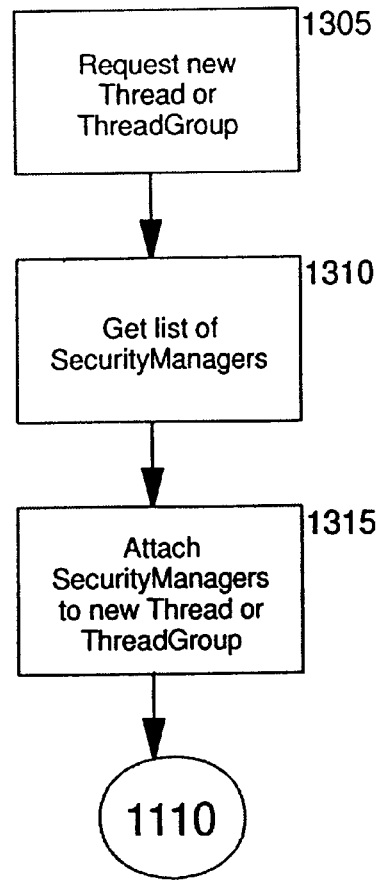
FIG. 13 shows an example of a method of creating the Threads and Threadgroups depicted in FIG. 12.

FIG. 13 depicts an example of a method of creating Child Threads 1220 and ThreadGroups 1230 in accordance with the present invention. When a new Thread or ThreadGroup needs to be created in step 1105 of FIG. 11, perform step 1305 instead. In step 1305 a Parent Thread 1200 requests the creation of a Child Thread 1220 or Child ThreadGroup 1230, and the Thread or ThreadGroup is created. In step 1310, the List of SecurityManagers 1210 associated with the Parent Thread 1200, as described in FIGS. 7, 8 and 9, is obtained. In step 1315, the List of SecurityManagers 1210 is associated with the Child Thread 1220 or Child ThreadGroup 1230. Execution resumes with step 1110.

Now that the invention has been described in a preferred embodiment, with alternatives, it will be understood that those skilled in the art, both now and in the future, may make various improvements and enhancements which fall within the scope of the claims which follow. These claims should be construed to maintain the proper protection for the invention first disclosed.

b. Citations

1. P. Chan and R. Lee, "The Java Class Libraries: An Annotated Reference," Addison Wesley, Reading, Massachusetts, 1997.

2. D. Lea, "Concurrent Programming in Java: Design Principles and Patterns," Addison Wesley, Reading, Mass., 1996.

3. G. McGraw and E. W. Felten, "Java Security: Hostile Applets, Holes, and Antidotes," Wiley Computer Publishing, New York, 1997.

4. E. Cohen and D. Jefferson, "Protection in the Hydra Operating System," Operating Systems Review, Vol. 9, No. 5; also in Proceedings of the Fifth Symposium on Operating System Principles, November 1975, pp. 141–159.

5. E. I. Organick, "Computer System Organization: The B5700/B6700 Series," Academic Press, 1973.

6. M. E. Houdek, et al., "The IBM System 38 Support For Capability-Based Addressing," Conference Proceedings of the Eighth Annual Symposium on Computer Architecture; also in ACM SIGARCH Newsletter 9,3, May 1981, pp. 341–348.

7. A. J. Herbert, "A New Protection Architecture for the Cambridge Capability Computer," ACM Operating Systems Review, Vol. 12, No. 1, January 1978, pp. 24–28.

8. M. V. Wilkes and R. M. Needham, "The Cambridge CAP Computer and its Operating System," North Holland, N.Y., 1979.

9. S. Zeigler, et al., "Ada for the Intel 432 Microcomputer," IEEE Computer, June 1981, pp. 47–56.

10. H. Levy, "Capability-based Computer Systems," Digital Press 1984.

11. A. S. Tanenbaum, et al., "Experiences with the Amoeba distributed operating system,", Communications of the ACM, Vol. 33, No. 12, December 1990.

12. R. Rashid, "Threads of a New System," UNIX Review, 1986.

13. T. Lindholm and F. Yellin, "The Java Virtual Machine Specification," Addison Wesley, Reading Mass., 1997.

14. J. Gosling, et al., "The Java Application Programming Interface, Volume 1: Core Packages," Addison Wesley, Reading Massachusetts, 1996.

15. D. Flanagan, "Java in a Nutshell," O'Reilly & Associates, Inc., Bonn, 1996.

I claim:

1. In a computer system including a system security manager and a multithreaded application environment, a computerized method of supporting multiple security or resource contexts, said method comprising the steps of:

instantiating at least one thread for an execution of content, each thread having at least one content context;

associating each content context with a content loader for loading said each context for execution;

associating the loader with one of a security requirement and a resource requirement, wherein the requirement may vary according to said each content context; and dynamically managing one of a security request and a resource request for each thread according to an associated requirement.

2. The method of claim 1, wherein the requirement is the security requirement, further comprising the steps of:

said instantiating step comprises the step of instantiating multiple threads, at least two of the threads having different security requirements; and dynamically managing security for said each thread as a function of the different security requirements.

3. The method of claim 1, further comprising the step of instantiating security managers and associating instances of security managers with the content loader.

4. The method of claim 3, wherein said step of associating security managers with the content loader is done indirectly.

5. The method of claim 3, wherein said step of dynamically managing comprises the step of redirecting the security requests from the system security manager to the instances of security managers.

6. The method of claim 3, further comprising the steps of:

said system security manager receiving said one of the security request and the resource request;

searching for and identifying all security managers associated with the thread; and selecting a most restrictive one of the security requirement and the resource requirement associated with said all security managers.

7. The method of claim 6, wherein no security mangers are identified, further comprising the step of assigning a default security manager.

8. The method of claim 3, further comprising the steps of:

said system security manager receiving said one of the security request and the resource request;

constraining said searching by determining if the content is trusted.

9. The method of claim 1, further comprising the steps of:

said system security manager receiving the resource request;

determining if a resource associated with the resource request is nominally shared by all threads; and instantiating and associating a non-shared copy of a nominally shared resource with the content loader.

10. The method of claim 9 wherein the step of associating the nonshared copy of a nominally shared resource is indirectly associated with the content loader.

11. The method of claim 3, wherein the resource requirement includes resource limits, said method comprising the steps of:

said system security manager receiving the resource request;

searching for and identifying all security managers associated with the thread, in response to said system security manager receiving the resource request; and identifying by said all security managers whether resource limits have been exceeded.

12. The method of claim 1, wherein the application environment is a Java virtual machine.

13. The method of claim 1, wherein said step of associating the loader comprises the step of associating the loader with an unrestricted requirement.

14. The method of claim 1, further comprising the step of associating a child thread or child threadgroup with one of the security requirement and the resource requirement.

15. The method of claim 1, further comprising the steps of:

said instantiating step comprising instantiating a runtime stack for each thread, the stack including at least one stack frame, wherein the content context represents one of an uncompleted method and subroutine call in the thread.

16. A computer system for supporting multiple security or resource contexts, said system comprising:

a system security manager coupled to a multithreaded application environment;

means for instantiating at least one thread for an execution of content, each thread having at least one content context;

means for associating each content context with a content loader for loading said each context for execution;

means for associating the loader with one of a security requirement and a resource requirement, wherein the requirement may vary according to said each content context; and means for dynamically managing one of a security request and a resource request for each thread, coupled to said means for associating.

17. The system of claim 16, wherein the requirement is the security requirement, further comprising:

said means for instantiating comprises means for instantiating multiple threads, at least two of the threads having different security requirements; and means for dynamically managing comprises dynamically managing security for said each thread as a function of the different security requirements.

18. The system of claim 16, further comprising means for instantiating security managers and associating instances of security managers with the content loader.

19. The system of claim 18, wherein said means for associating security managers with the content loader indirect.

20. The system of claim 18, wherein said means for dynamically managing comprises means for redirecting the security requests from the system security manager to the instances of security managers.

21. The system claim 18, further comprising:

means for said system security manager to receive said one of the security request and the resource request;

means for searching for and identifying all security managers associated with the thread coupled to said means for said system security manager; and means for selecting a most restrictive one of the security requirement and the resource requirement associated with said all security managers.

22. The system of claim 21, wherein no security mangers are identified, further comprising means for assigning a default security manager.

23. The system of claim 18, further comprising the steps of:

means for said system security manager to receive said one of the security request and the resource request; and means for constraining said searching by determining if the content is trusted.

24. The system of claim 16, further comprising the steps of:

means for said system security manager to receive the resource request;

means for determining if a resource associated with the resource request is nominally shared by all threads; and means for instantiating and associating a non-shared copy of a nominally shared resource with the content loader, coupled to said means for determining.

25. The system claim 24 wherein the nonshared copy of a nominally shared resource is indirectly associated with the content loader.

26. The system of claim 18, wherein the resource requirement includes resource limits, said system method comprising:
   means for said system security manager to receive the resource request;
   means for searching for and identifying all security managers associated with the thread, in response to said system security manager receiving the resource request; and
   means for identifying by said all security managers whether resource limits have been exceeded.

27. The system of claim 16, wherein the application environment is a Java virtual machine.

28. The system of claim 16, wherein means for associating the loader comprises means for associating the loader with an unrestricted requirement.

29. The system of claim 16, wherein means for associating a child thread or child threadgroup with one of the security requirement and the resource requirement.

30. The system of claim 16, further comprising;
   said means for instantiating comprising means for instantiating a runtime stack for each thread, the stack including at least one stack frame, wherein the content context represents one of an uncompleted method and subroutine call in the thread.

* * * * *